(12) United States Patent
Tzidon et al.

(10) Patent No.: US 8,756,995 B2
(45) Date of Patent: Jun. 24, 2014

(54) DEVICE AND METHOD FOR COMBINING SAMPLES FROM AN INERTIAL MEASUREMENT SENSOR CLUSTER

(71) Applicant: Elbit Systems Ltd., Haifa (IL)

(72) Inventors: Dekel Tzidon, Hod Hasharon (IL); Alex Braginsky, Rison Lezion (IL)

(73) Assignee: Elbit Systems Ltd., Haifa (IL)

( * ) Notice: Subject to any disclaimer, the term of this patent is extended or adjusted under 35 U.S.C. 154(b) by 0 days.

(21) Appl. No.: 13/924,743

(22) Filed: Jun. 24, 2013

(65) Prior Publication Data

US 2013/0297250 A1  Nov. 7, 2013

Related U.S. Application Data

(63) Continuation of application No. 13/127,378, filed as application No. PCT/IL2009/000990 on Oct. 22, 2009, now abandoned.

(30) Foreign Application Priority Data

Nov. 4, 2008 (IL) .......................................... 195104

(51) Int. Cl.
*G01P 15/18* (2013.01)
*G01C 21/00* (2006.01)
*G01P 3/04* (2006.01)

(52) U.S. Cl.
USPC .......................... 73/510; 73/178 R; 73/514.01

(58) Field of Classification Search
USPC ......... 73/514.01, 510–511, 178 R; 702/1, 33, 702/55; 701/200, 207, 220, 221, 400, 408, 701/420, 421
See application file for complete search history.

(56) References Cited

U.S. PATENT DOCUMENTS

| | | | |
|---|---|---|---|
| 4,125,017 A | 11/1978 | Dhuyvetter et al. | |
| 4,179,818 A | 12/1979 | Craig | |
| 4,566,327 A | 1/1986 | Rider | |
| 4,601,206 A | 7/1986 | Watson | |
| 6,122,538 A | 9/2000 | Sliwa, Jr. et al. | |
| 6,128,955 A | 10/2000 | Mimura | |
| 6,484,577 B1 | 11/2002 | Bennett | |
| 7,257,512 B1 | 8/2007 | Ackerman | |
| 7,395,709 B2 | 7/2008 | Noda et al. | |
| 8,020,442 B2 | 9/2011 | Ell et al. | |
| 8,037,759 B2 | 10/2011 | Peters et al. | |
| 8,056,412 B2 | 11/2011 | Rutkiewicz et al. | |
| 8,260,477 B2 | 9/2012 | Almalki et al. | |
| 2006/0152842 A1 | 7/2006 | Pasolini et al. | |
| 2008/0021336 A1 | 1/2008 | Dobak | |
| 2008/0269963 A1 | 10/2008 | Vos et al. | |
| 2011/0209544 A1* | 9/2011 | Tzidon et al. ............... 73/514.01 |

OTHER PUBLICATIONS

International Search Report mailed Jan. 28, 2010, issued for International Application No. PCT/IL09/00990 (2 pages).
Non-Final Office Action mailed Mar. 22, 2013 for U.S. Appl. No. 13/127,378 (15 pages).

\* cited by examiner

*Primary Examiner* — Helen Kwok
(74) *Attorney, Agent, or Firm* — Brown Rudnick LLP (57) ABSTRACT

Device and method for providing inertial indications with high accuracy using micro inertial sensors with inherent very small size and low accuracy. The device and method of the invention disclose use of the cluster of multiple micro inertial sensors to receive from the multiple sensors an equivalent single inertial indication with high accuracy based on the multiple independent indications and mathematical manipulations for averaging the plurality of single readings and for eliminating common deviations based, for example, on measurements of the deviation of the single readings.

17 Claims, 8 Drawing Sheets

DEVICE AND METHOD FOR COMBINING SAMPLES FROM AN INERTIAL MEASUREMENT SENSOR CLUSTER

CROSS REFERENCE

This application is a Continuation of U.S. Ser. No. 13/127,378, filed as a National Phase of PCT application PCT/IL2009/000990, which claims priority from Israel Patent Application 195104 filed on Nov. 4, 2008.

FIELD OF THE INVENTION

The present invention relates to navigation. More particularly, the present invention relates to clusters of sensors for use in navigation.

BACKGROUND OF THE INVENTION

Navigation data, for the purpose of this invention, is comprised of (but not limited to) a body's position, velocity and orientation. Navigation is conducted by means of devices depending on external sources, such as GPS, and by means of independent devices such as inertial measurement unit (IMU). Accurate navigation requires physically big IMU sensors having relatively large physical dimensions, typically larger than 10 cubical centimeters as well as complex mounting techniques. In many situations, it is useful for personnel traveling on foot to carry a portable, light-weight and accurate navigation system. Such situations may include the training of military and rescue forces, and military and rescue operations. Such a navigation system may include an inertial measurement unit (IMU) for determining acceleration and orientation of the measured body. When acceleration and orientation are known, calculation of a current position may be made on the basis of a previous position. An IMU will generally include accelerometers oriented along various axes for measuring accelerations along those axes, and gyroscopes oriented along various axes for detecting changes of orientation with respect to those or other axes. Often, the axes selected are mutually orthogonal X, Y, and Z axes. Orientations are often defined in terms of roll, pitch and yaw.

However, position calculation on the basis of a portable IMU is subject to systematic and random errors. Various correction methods have been developed in order to compensate for these errors. Some of the correction methods rely on the sensor Error Model, which is a set of mathematical equations which describe the behavior of the sensor outputs in terms of random variables and their associated probability distributions. Solutions that have been proposed or adopted for compensating for errors include: zero velocity update sensors that identify points of a gait or motion where velocity may be assumed to be zero, an assumption of no roll to eliminate spurious results, periodic comparison with Global Positioning System (GPS) data, and measurements of the earth's magnetic field to verify orientation. Although magnetic field augmentation is widely used to correct orientation data, the direction of the local magnetic field is vulnerable to external interference, reducing the accuracy of yaw measurements.

It should be noted that the description of embodiments of the present invention herein below exemplifies aspects of the invention mostly by discussing implementations using sensors of the micro-electromechanical system (MEMS) sensors type. It would be apparent however for a person skilled in the art that other types of small-sized, small-weight and/or small-energy-consumption may be used instead of MEMS sensors.

Micro inertial sensors, such as MEMS inertial sensors, due to their small size, light weight, and low power consumption, are especially attractive for use in navigation systems in all applications sensitive to power, space and weight limitations. However, to a much greater extent than high-end, larger mechanical or optical inertial sensors, MEMS sensors are usually characterized by lack of stability, and poor observability (the ability to infer internal states from observed quantities). In addition, error models for MEMS sensors are not as well developed as for other inertial sensors, making the development of accurate correction algorithms for a MEMS-based inertial system difficult.

The sensor errors of a MEMS IMU may be modeled as random processes. A separate and specific model must be constructed and verified for each type of sensor, and, in fact, for each specific manufactured sensor of each type. The model may then be utilized in a Kalman Filter, or other type of estimator, in which the model is used to estimate the inertial sensor errors. However, the lack of stability of MEMS IMU sensor results may frustrate this effort.

There is therefore a need for accurate MEMS-based inertial navigation system.

It is an object of the present invention to provide an accurate MEMS-based inertial navigation system. Such a system may be used also as a portable navigation device.

SUMMARY OF THE INVENTION

There is thus provided, in accordance with some embodiments of the present invention, an inertial measurement device for measuring movement with respect to at least one axis of a reference frame, comprising at last one cluster of plurality of micro inertial sensors which comprising summing of samples indicative of movement reading from the plurality of sensors and calculating an equivalent vector indicative of an equivalent measurement of the sensors. Further is provided the measurement device and a computing device to apply compensation to the equivalent measurement to compensate for a common error of the plurality of sensors.

BRIEF DESCRIPTION OF THE DRAWINGS

In order to better understand the present invention, and appreciate its practical applications, the following Figures are provided and referenced hereafter. It should be noted that the Figures are given as examples only and in no way limit the scope of the invention. Like components are denoted by like reference numerals.

DETAILED DESCRIPTION OF EMBODIMENTS

In accordance with embodiments of the present invention, a MEMS-based navigation system is described that includes an inertial measurement unit (IMU).

Figure 1:
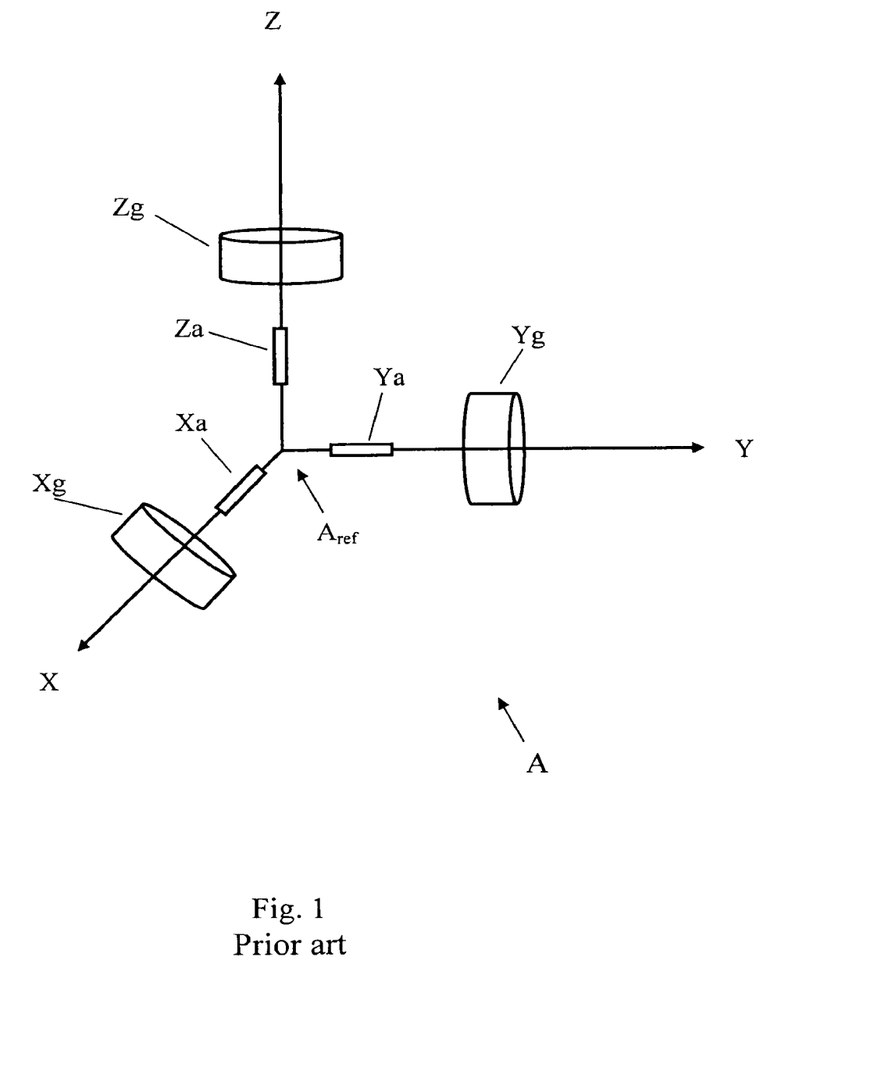
FIG. 1 schematically illustrates an accelerations measurement set of the known art.

Reference is made to FIG. 1, which schematically illustrates an accelerations measurement set A of the known art. In general, an IMU may include accelerometers, such Xa, Ya and Za or/and gyroscopes, such as Xg, Yg and Zg. Sensors of each type may be oriented along the axes of a reference axis system $A_{ref}$, such as an orthogonal coordinate system. In this way, the total acceleration may be calculated as the vector sum of the various linear accelerations. Similarly, when gyroscopes are oriented along a system of orthogonal axes, motion with respect to the axes (often described as roll, yaw, and pitch motions) may be measured directly. In general, sensor clusters will also be arranged substantially parallel to the main axes of an axes system. Further, individual sensors may be assembled in several ways in order to make up a sensor cluster.

IMU is typically subject to at least one of systematic and/or random errors due to which calculated position based on such IMU has a tendency to drift over time. IMU according to embodiments of the present invention may include a number of micro-electromechanical system (MEMS) based inertial navigational sensors that may be arranged into sensor clusters. Each sensor cluster may be made up of several sensors of a particular type in sufficient quantity that enables reduction of the systematic and/or random errors to an acceptable level, as will be explained in details herein after. The random errors of each sensor in a cluster according to the present invention may cancel each other, while systematic errors may be easily identified. The sensors that form a cluster may be accelerometers that measure acceleration along a linear axis, and/or gyroscopes that indicate changes in orientation with respect to an axis. The navigation system may include a computer capable of storing data and programmed instructions. The programmed instructions, when executed by the computer, may calculate updated navigational positions based on stored data and on the output of the sensor clusters. The navigation system may include other devices to aid in correcting navigational errors. The outputs of these other, auxiliary devices may also be utilized in the calculation. Auxiliary devices may include a Global Positioning System (GPS) receiver for providing time, position, or pseudo-range data, cellular triangulation, RFID-related techniques, visual aids, magnetic sensors. Additional possible auxiliary device is a micro-switch or a sensor that detects or indicates points of zero-velocity to be used in a zero-velocity update correction. A processed joint output of the sensor cluster may be described by an error model that is more statistically stable than that describing a single sensor. Knowing the distribution of the error sources may enable statistical error correction.

Figure 2A:
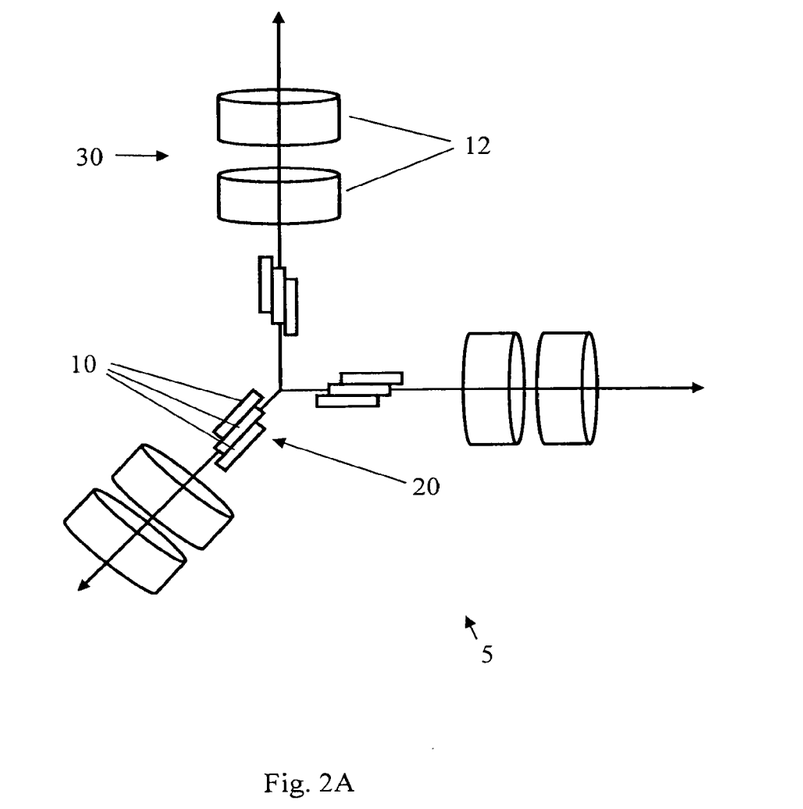
FIG. 2A is a schematic illustration of axial placement of sensor clusters in a reference system in accordance with embodiments of the present invention.

Reference is made now to FIG. 2A, which is a schematic illustration of axial placement of sensor clusters in a reference system 5, in accordance with embodiments of the present invention. Individual accelerometers 10 and gyroscopes 12 may be arranged into clusters 20, 30 respectively. Each cluster may be oriented substantially along one of the orthogonal X, Y and Z axes. The particular readings of individual accelerometers 10 of a cluster of accelerometers 20, and/or gyroscopes 12 of a cluster of gyroscopes 30, which are oriented along a particular axis may be combined to form a single combined reading for the respective cluster. In this case, the sum of the output samples of at least some of the sensors of a cluster of each type that are oriented along a particular axis is the output of that cluster which may be treated as an output of a single virtual sensor. Since the output signals of the single sensors of a particular cluster differ from one another in a statistically mutually independent manner, the sum of the output samples is expected to be more stable than the output of any single sensor in that cluster. Furthermore, as the number of sensors increases, the sum of the value of the summed output samples is expected to become more stable.

Figure 2B:
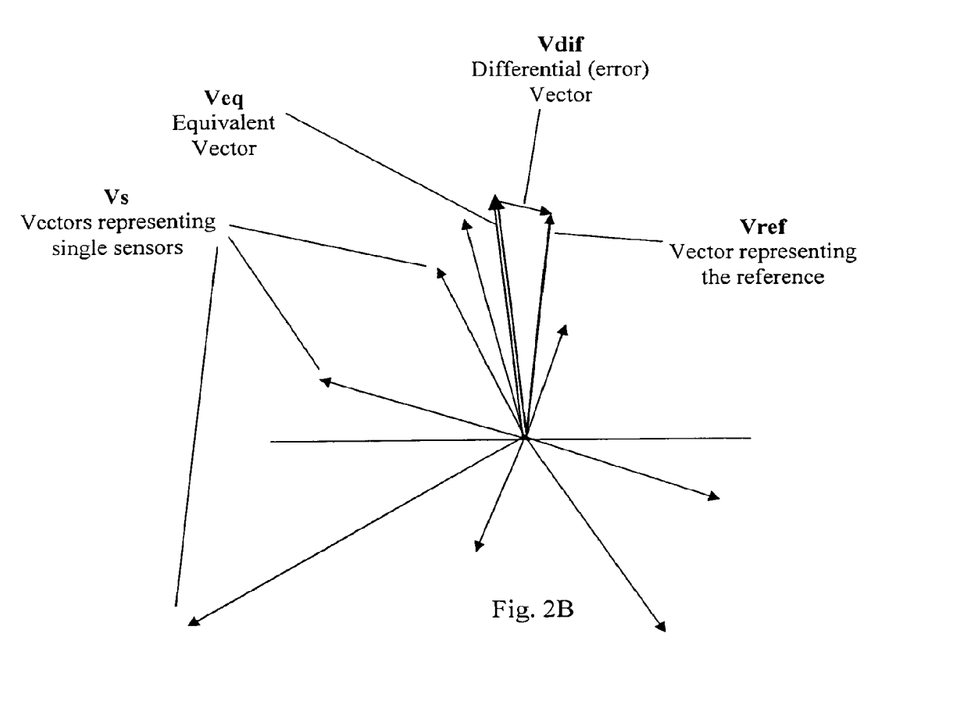
FIG. 2B schematically illustrates summation of a group of vectors according to embodiments of the present invention.

Reference is made now to FIG. 2B, which schematically illustrates summation of a group of vectors according to embodiments of the present invention. FIG. 2B depicts plurality of vectors Vs, each represents a specific indication, or sample, of a measurement as measured by a single sensor in a group of sensors (cluster) measuring a single an measurement, such a linear acceleration or a rotational acceleration, with respect to a single axis. The plurality of indications, or samples, Vs may vary in direction and/or magnitude, with respect to their respective axis or with respect to each other. For example, such variations may occur as a result of variations during a production process and/or during placement of the various sensors in the group, or cluster. The various indications Vs may be summed, according to embodiments of the invention to a single vector Veq, representing the equivalent vector of the summed measurements, or samples. As the number of the sensors in a cluster increases the total random error in Veq may be decreased. Vref represents the "truth", with reference to which the cluster measurement is evaluated. The difference Vdif between Veq and Vref represents the systematic error and the remaining random error. It should be noted that the systematic error may be eliminated using a calibration process.

Figure 2C:
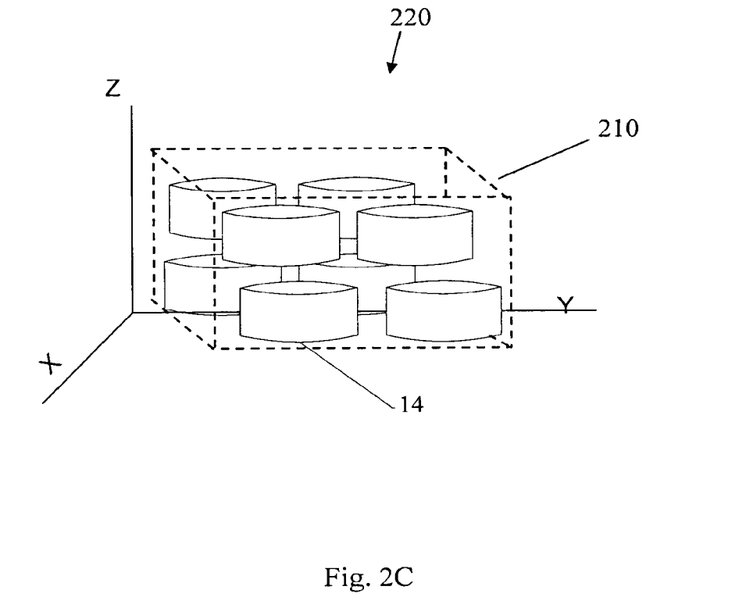
FIG. 2C is a schematic illustration of spatial placement of sensors in accordance with embodiments of the present invention.
Figure 3:
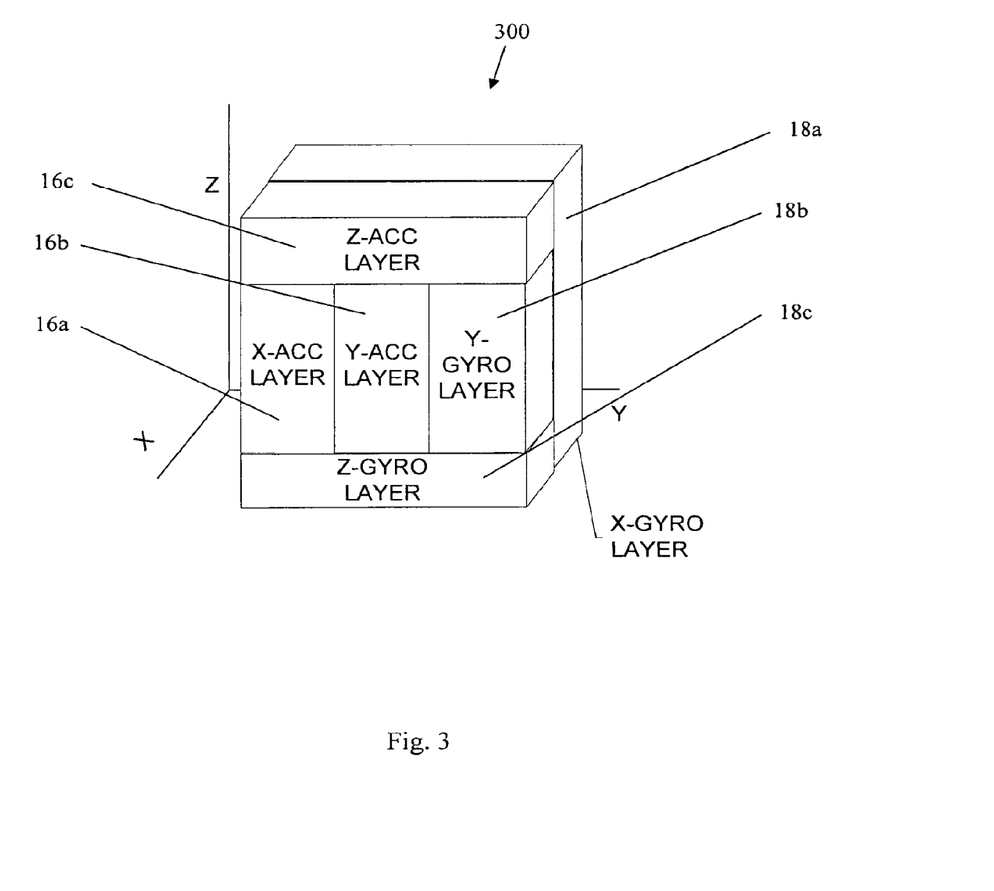
FIG. 3 is a schematic illustration of an example of sensor clusters organized into a single device.

Reference is made now to FIG. 2C which is a schematic illustration of spatial placement of sensors in accordance with embodiments of the present invention. A plurality of sensors 14 may represent either accelerometers or gyroscopes. In the example shown, sensors 14 are oriented parallel to the Z-axis. Sensors 14 are placed so as to fill a three-dimensional space 210. Spatially placed sensors 14 when placed in a three dimensional space 210 may be considered as a cluster 220. Spatially placed sensor clusters of various types and orientations may be organized in the form of layers in a sensor cluster device. Reference is made now also to FIG. 3, which is a schematic illustration of an example of a plurality of sensor clusters organized into a single device 300, according to embodiments of the present invention. Accelerometer-type sensors may be organized, according to embodiments of the present invention, as layers 16a, 16b, 16c, while gyroscope-type sensors may be organized as layers 18a, 18b, 18c. The above described arrangement of clusters of sensors in device 300 is only a single example out of a large number of possible arrangements.

There are several possible ways of assembling micro inertial sensors, such as MEMS sensors, into a sensor cluster. One possibility is to manufacture a plurality of MEMS sensors, where each MEMS sensor, either an accelerometer or a gyroscope, is manufactured separately and then assembled the plurality MEMS sensors in a cluster. Typically each cluster is assembled from a plurality of MEMS sensors of the same type, either accelerometer and/or gyroscope.

According to embodiments of the present invention during the assembling of a sensor cluster, each MEMS sensor may be aligned to one of the axes of a reference frame of the cluster, so that the sensor axis is aligned with an axis of the reference frame and then the MEMS sensor may be assembled into the cluster. Such a method of assembly may be designated as macro assembly.

According to yet other embodiments of the present invention another way of assembling a MEMS sensor cluster may be designated integrated assembly. According to this method, production of a sensor cluster is integrated into a process of manufacturing single MEMS sensors from silicon or other material. Accordingly, the MEMS manufacturing process includes, as one or more of its integral steps, production from the silicon an integrated MEMS sensor cluster that includes a number of aligned MEMS sensors. A micro inertial sensor may have a sensor axis. A sensor axis may be defined as an imaginary or a real line referenced to a micro inertial sensor so that when the sensor is oriented to have sensor axis parallel to one axis in case of an accelerometer or coaxial with one axis in case of a gyroscope, of a reference frame and the sensor is excited by a motion in the direction of any one of the other two axes the reading of the sensor will be virtually null. Accordingly, a sensor may be considered 'misaligned' with respect to an axis of a reference frame when its axis is not parallel to that axis of the reference frame and may be considered 'misplaced' with respect to an axis of a reference frame when its axis is not coaxial with that axis of the reference frame. Same may be applied to a single micro inertial sensor within a sensor cluster.

Basing IMU sensors on MEMS technology may enable assembling of a large number of sensors, from tens to tens of thousands, into a relatively light and physically small device with predefined accuracy and drifting characteristics. Such a device can be installed in virtually any environment and application which is sensitive to size, weight and power consumption limitations.

An example of possible use of an IMU based on MEMS cluster technology of the present invention is for a pedestrian user. A navigation device incorporating a MEMS IMU may be carried by one or more members of a team of personnel. For example, in accordance with embodiments of the present invention, components of a navigation device carried by a pedestrian user may comprise a computer unit for performing calculations, for storing data and for communicating with another user or with other devices. The computer unit may be worn by a user; the user may be a team member, in a pocket, pouch, etc. The navigation device may further comprise a GPS receiver, for providing correction data, which may be either worn separately by a team member or may be integrated into the computer unit. An IMU, containing one ore more MEMS accelerometer cluster and/or gyroscope clusters, may be fixed to the body of a team member. For example, the IMU may be integrated into a boot. According to embodiments of the invention a micro-switch for applying or invoking zero-velocity update measurement may also be integrated, for example, into the boot of a team member. Depending on the configurations, bulks, weights and other such considerations relating to components of the system, and depending on the needs of a team of users, the various components of the system may be carried by one person, or may be distributed among a plurality of team members.

It is desirable to have individual MEMS sensors within a cluster aligned to a reference frame. However, due to manufacturing process limitations, sensors within a cluster may be positioned at a different location and orientation. Each sensor's location and orientation may directly affect each sensor's measurement. Thus compensation calculations have to be applied to each of the sensors' measurements prior to their incorporation into a single cluster. Each sensor location and orientation data is obtained during the manufacture and stored in a memory (e.g. 32 in FIG. 5). The stored data representing the misalignment of any kind may enables calculation of compensation for the non-orthogonally or otherwise misalignment.

Figure 4:
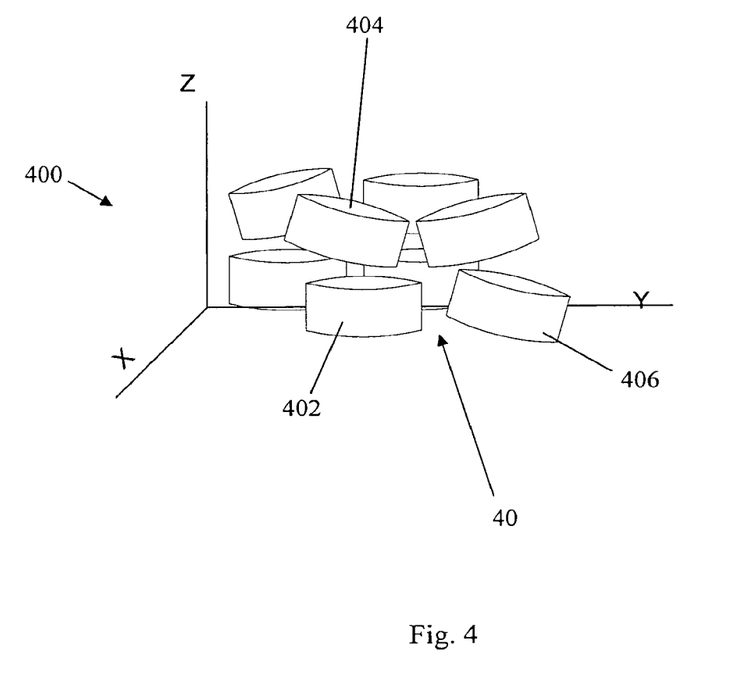
FIG. 4 illustrates schematically random placement of sensors in an integrated cluster.

In the case of integrated sensor cluster assembly, alignment of sensors within a cluster is governed by manufacturing process and thus location and orientation of each sensor within a cluster can be considered random. Reference is now made to FIG. 4, which illustrates schematically random placement and/or orientation of sensors in an integrated cluster 40. During the manufacturing process of an integrated sensor cluster, a series of measurements may be performed of the sensor cluster. The series of measurements may result in a list of data items representing measurement of the location and orientation of one or more individual sensors 402, 404, 406, etc. with respect to a reference frame 400 of the sensor cluster 40. Displacement measurement result data may be stored in the form of coordinates of the displacement of each sensor from reference frame 400 of sensor cluster 40. Orientation measurement result data may be stored in the form of a list of Euler angles (corresponding to roll, pitch, and yaw) that may describe the orientation of the axis of each individual sensor relative to reference frame 400 of cluster 40. The stored data may be used to compensate the output of each sensor for the misalignment of the sensor when calculating the combined output of the sensor cluster.

Figure 5:
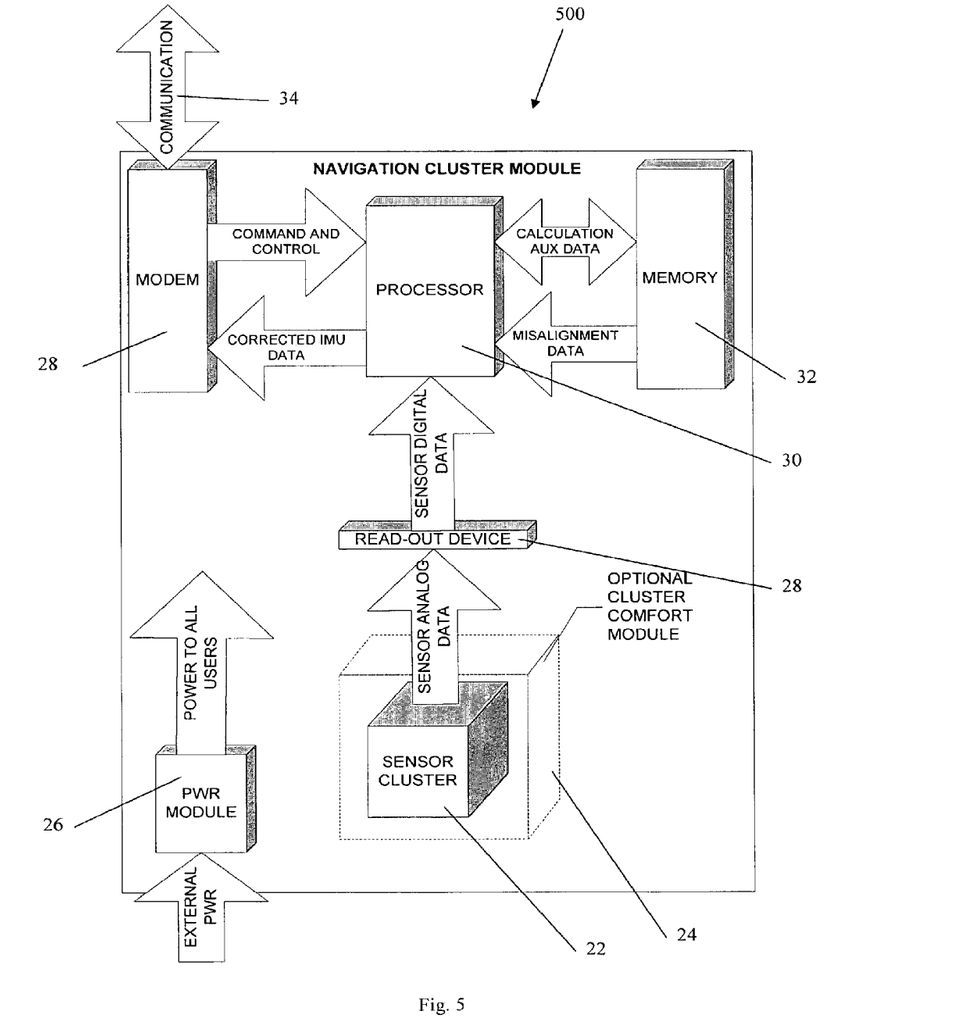
FIG. 5 is a block diagram of a navigation unit based on sensor clusters in accordance with embodiments of the present invention.

Reference is made now to FIG. 5, which is a block diagram of a navigation unit 500 based on sensor clusters, in accordance with embodiments of the present invention. Navigation unit 500 may comprise power module 26 to transform electrical power from an external source, such as AC mains, battery, rechargeable battery, etc., to stabilized electrical power. The stabilized electrical power may be provided to all components of navigation unit 500. Navigation unit 500 further comprises one or more sensor cluster 22 to generate signals in response to accelerations and/or changes in orientation of sensor cluster 22. The signals generated by sensor cluster 22 are typically analog signals, yet other forms of signal are possible. Sensor cluster 22 may be surrounded by an isolating enclosure 24, also referred to as a "cluster comfort" module. The purpose of isolating enclosure 24 is to partially isolate sensor cluster 22 from the environment, to reduce temperature changes and mechanical vibrations that could adversely affect the accuracy of the sensor readings. In case the type of signals generated by sensor cluster 22 does not suit the type of signals required for further handling in navigation unit 500 the signals may be converted by signal conversion unit 28 to the required signal type or form, such as digital signal. The data from reading device 28, in the required form, may be input to processor 30 for further processing. Processor 30 may communicate with modem 28 and memory unit 32. Processor 30 may further be in active communication with other units, for example I/O unit (not shown), as may be needed according to specific design and requirements of navigation unit 500. Processor 30 may receive stored misalignment data from memory unit 32. Processor 30 may process data from the sensor cluster 22, representing momentary readings of accelerations and orientations of sensor cluster 22 with respect to a reference frame, making use of the stored misalignment data to compensate for misalignment of sensors in sensor cluster 22. Modem 28 may provide communication with external devices via one or more communications channels 34. External devices may comprise one or more control devices. External control device may transmit command and control instructions, such as "reset", "go to certain point", etc. to the processor via communications channels 34 and modem 28. Processor 30 may serve as a navigation computer. Processor 30 may receive data from external devices via communications channels 34 and modem 28. Such external devices may include a GPS receiver or a zero-velocity update device. Calculation results of processor 30, relating, for example, to updates of user location may be saved in memory unit 32 for later retrieval for use in processing. Processed data may be transmitted to external devices also by means of modem 28 and communications channels 34. External devices may utilize the processed data to calculate navigation information, which may in turn be communicated to the user.

Figure 6:
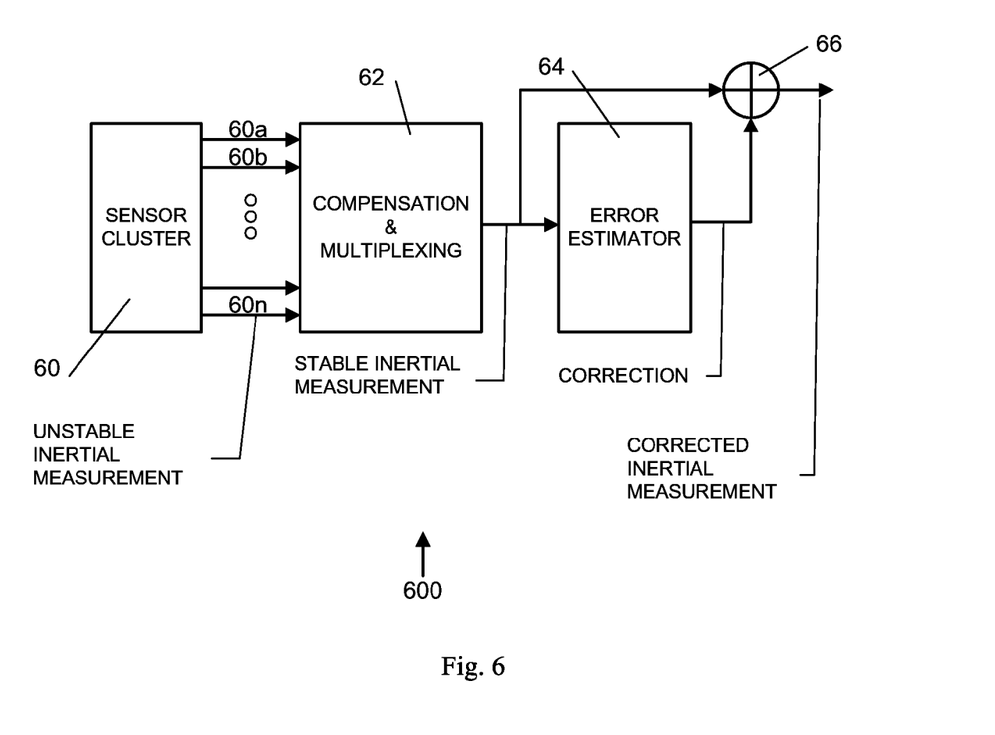
FIG. 6 is a block diagram of error compensation processing system in accordance with embodiments of the present invention.

Processor 30 may process the output from an individual sensor of sensor cluster 22. The output of an individual sensor, which may be unstable, may be compensated for instability and other errors by proper calculations performed in processor 30. Compensated and stabilized inertial measurements may be outputted to external devices. Reference is made now to FIG. 6, which is a block diagram of error compensation processing process 600 in accordance with embodiments of the present invention. Sensor cluster data 60 may be received from output readings of one or more sensor clusters and may consist of unstable inertial measurement outputs from individual sensors of the one or more sensor clusters. Compensation calculations may be applied to the individual outputs 60a, 60b, . . . 60n to compensate for variations in the alignment and displacement of individual sensors from a reference frame of the sensor cluster. The compensated individual outputs may be multiplexed to yield a more stable inertial measurement result for each sensor cluster (62). An error may be estimated for each sensor cluster result, based on an error model (64). A correction value may be calculated to compensate for the estimated error, and may be summed with the corresponding sensor cluster result (66). The result of summing the correction value with the sensor cluster result is a corrected and stabilized inertial measurement.

Errors of reading of sensors in a sensor cluster that may need to be corrected may be modeled by distributions that are substantially symmetric about a mean value. Examples of such distributions are Gaussian and Student distributions. Those errors with a zero mean may be cancelled, at least partially, by means of combining outputs from a large number of sensors. Those errors with a non-zero mean may be corrected by means of calibration measurements and respective corrections. Combining the outputs of a large number of sensors may also contribute to the effectiveness of the calibration by increasing the stability of the values to which the calibration is applied. Error estimates may also be partially based on auxiliary data. For example, data from a GPS receiver may be used to estimate an error in a geographical position. Data from a measurement of the earth's magnetic field may be used to estimate an error in a geographical orientation. Data from a zero-velocity update sensor may be used to estimate the error in a velocity calculation.

Thus, according to embodiments of the present invention, an IMU device is provided that incorporates one or more clusters of MEMS inertial sensors. The IMU may be incorporated into a navigation device. A navigation device incorporating a MEMS sensor cluster IMU may be portable and may yield stable navigation data when multiple readings of individual MEMS sensors which may be corrected and stabilized based on displacement and misalignment data and further, optionally, based on external data indicative of location and/or orientation and/or velocity.

It should be clear that the description of the embodiments and attached Figures set forth in this specification serves only for a better understanding of the invention, without limiting its scope.

It should also be clear that a person skilled in the art, after reading the present specification could make adjustments or amendments to the attached Figures and above described embodiments that would still be covered by the present invention.

The invention claimed is:

1. An inertial measurement device comprising:
   at least one sensor cluster, each of said at least one sensor cluster comprising a plurality of micro inertial sensors being oriented substantially along same respective axis, for sampling movement of said inertial measurement device with respect to each of said respective axis of a plurality of axes of a reference frame, each of said plurality of micro inertial sensors exhibits a respective random error; and
   a summing unit to receive individual respective samples from at least some of said plurality of micro inertial sensors indicative of said movement with respect to said respective axis and to reduce a total random error in an equivalent vector that is calculated by summing said individual respective samples by said summing unit, wherein said equivalent vector is indicative of sampled said movement.

2. The device as claimed in claim 1, further comprising a computing unit operative to receive stored misalignment data so as to compensate for misalignment of said plurality of micro inertial sensors in said at least one sensor cluster in the calculation of said equivalent vector.

3. The device as claimed in claim 1, wherein said plurality of micro inertial sensors is of the micro-electromechanical sensor type.

4. The device as claimed in claim 1, wherein said plurality of micro inertial sensors comprises more than one micro-electromechanical sensor.

5. The device as claimed in claim 1, wherein said plurality of micro inertial sensors comprises more than one gyroscope sensor.

6. The device as claimed in claim 1, wherein at least some of said plurality of micro inertial sensors are substantially aligned with each one of said axes of a three-dimensional said reference frame.

7. The device as claimed in claim 1, wherein said plurality of micro inertial sensors comprises an integrated sensor cluster.

8. The device as claimed in claim 1, wherein at least some in said plurality of micro inertial sensors are spatially displaced by respective known amounts from a pivot axis of said at least one sensor cluster.

9. The device as claimed in claim 1, wherein an orientation of an axis of each one of said plurality of micro inertial sensors is angularly misaligned by a respective known amount with respect to an orientation of said axis of respective said at least one sensor cluster.

10. The device as claimed in claim 2, wherein said computing unit combines separate outputs of said plurality of micro inertial sensors to yield a compensated output for each respective one of said at least one sensor cluster.

11. The device as claimed in claim 10, wherein said device communicates with at least one additional device selected from a list comprising a Global Positioning System receiver, and a zero-velocity update sensor.

12. The device as claimed in claim 10, wherein said device is worn or carried by a person.

13. An inertial measurement method comprising:
  reading separate respective outputs of at least some in a plurality of micro inertial sensors of a sensor cluster, said plurality of micro inertial sensors being oriented substantially along same respective axis in a plurality of axes of a reference frame, each of said plurality of micro inertial sensors exhibits a respective random error; and
  combining said separate respective outputs to yield a single combined output of said sensor cluster, so to reduce a total random error in said single combined output, said combined output indicative of movement of said sensor cluster in said reference frame.

14. The method as claimed in claim 13, further comprising the steps of:
  estimating an error in said single combined output of said sensor cluster, according to an error model of each of said plurality of micro inertial sensors;
  calculating a correction to compensate for said error; and
  applying said correction to said single combined output of said sensor cluster to yield a corrected value.

15. The method as claimed in claim 14, further comprising the steps of:
  reading an output of at least one additional device selected from a list comprising a Global Positioning System receiver, and a zero-velocity update sensor; and
  utilizing said output of said at least one additional device in estimating said error in said single combined output of said sensor cluster.

16. The method as claimed in claim 13, further comprising the steps of:
  providing an amount of displacement of each of said plurality of micro inertial sensors in relation to a pivot axis of said sensor cluster, each of said amount of displacement being stored by a memory device; and
  adjusting said separate respective outputs of each of said plurality of micro inertial sensors according to each of respective said amount of displacement.

17. The method as claimed in claim 13, further comprising the steps of:
  providing an amount of deviation of an axis of each of respective said plurality of micro inertial sensors in relation to respective said axis of said sensor cluster, said amount of deviation being stored by a memory device; and
  adjusting said separate respective outputs of each of said plurality of micro inertial sensors according to respective said amount of deviation.

* * * * *